June 10, 1952 R. H. HALVORSEN 2,599,988

AUTOMATIC TELEGRAPH SWITCHING

Filed April 28, 1950 3 Sheets-Sheet 1

INVENTOR
RALPH H. HALVORSEN
BY Emery Robinson
ATTORNEY

INVENTOR
RALPH H. HALVORSEN
BY Emery Robinson
ATTORNEY

June 10, 1952 R. H. HALVORSEN 2,599,988

AUTOMATIC TELEGRAPH SWITCHING

Filed April 28, 1950 3 Sheets-Sheet 3

INVENTOR
RALPH H. HALVORSEN
BY Emery Robinson
ATTORNEY

Patented June 10, 1952

2,599,988

UNITED STATES PATENT OFFICE 2,599,988

AUTOMATIC TELEGRAPH SWITCHING

Ralph H. Halvorsen, Chicago, Ill., assignor to Teletype Corporation, Chicago, Ill., a corporation of Delaware

Application April 28, 1950, Serial No. 158,790

8 Claims. (Cl. 178—2)

The present invention relates to printing telegraphy and more particularly to automatic printing telegraph switching systems.

The invention is particularly suitable for small system applications, however this is not to be construed as a limitation upon the invention as it is applicable also to systems employing a large number of stations and much telegraph apparatus. The principal object of the present invention is to provide a simple and efficient automatic telegraph switching system which employs principally apparatus of the type presently well known and widely used in the telegraph art.

The system will be described as having ten outgoing lines each of which has one or more stations on it. At the central office, where the switching operations are accomplished, a selective control unit is provided for each line. This selective control unit is of the type disclosed in the application for patent of W. J. Zenner, Serial No. 739,747, now Patent No. 2,568,264, issued September 18, 1951, filed April 7, 1947, which is hereby incorporated into the present disclosure by reference. It is assumed that each incoming message from an outlying station will contain, at the beginning, an address sequence identifying the station or stations to which the message is to be transmitted. The selective control unit, associated with the line from which the message originates, responds to the address signal by enabling a reperforator corresponding to the line on which the addressee station is located, to reperforate the message in tape form. A transmitter associated with this reperforator is thereupon immediately ready to commence transmitting the message to the addressee station. Before the transmitter can actually commence transmitting, the necessary connecting circuits to the addressee station are established. Upon the establishment of the connecting circuits a circuit to the clutch magnet of the transmitter is established in order to cause the transmitter to transmit the message. The connecting circuits for each of the transmitters are part of a sequence circuit which permit but a single transmitter to transmit over an outgoing line at any one time.

Another object of the present invention is to intercept all improperly addressed messages at the central office and thereby avoid loss of such messages and permit their being stored until proper distribution can be ascertained.

Figure 1:
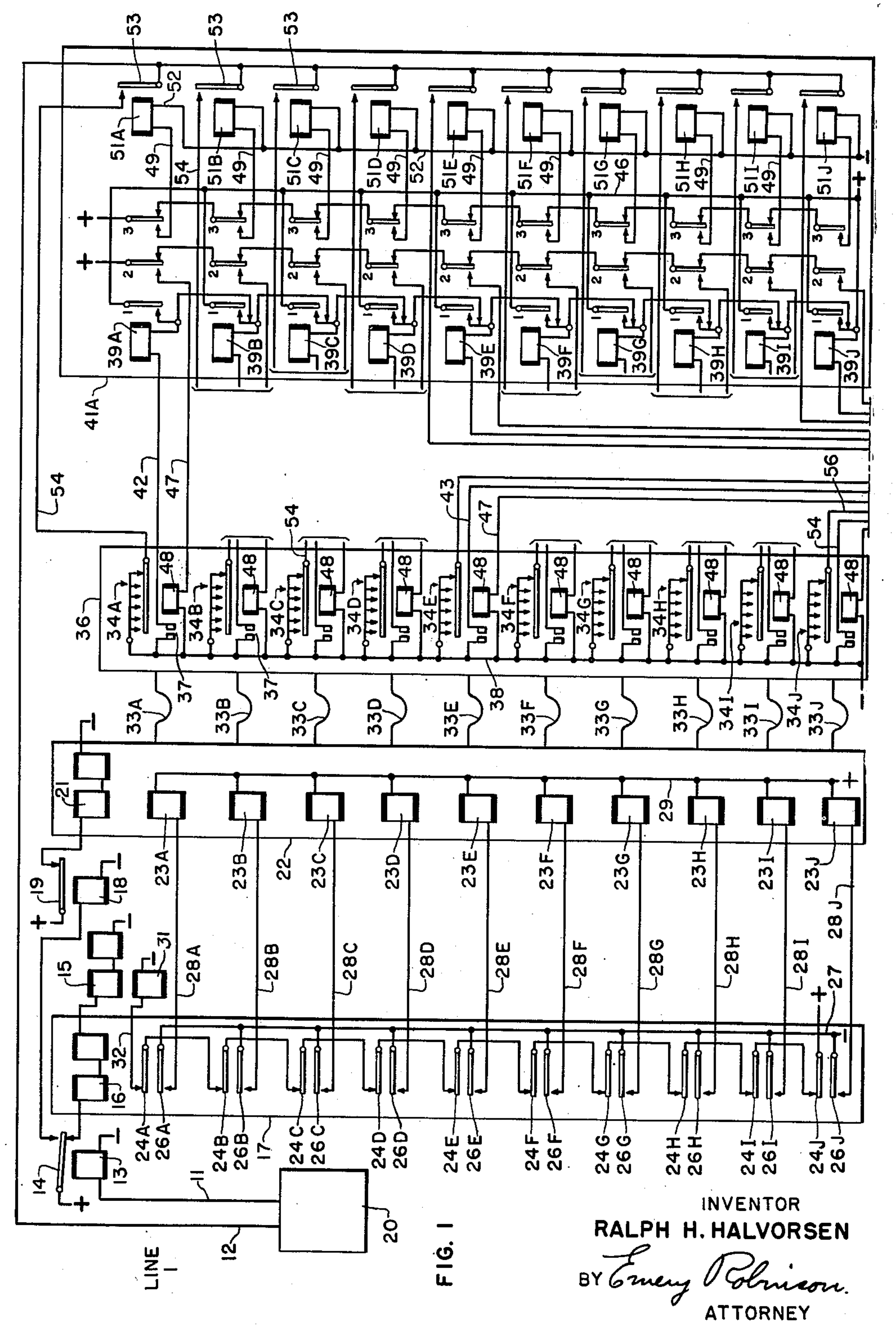
Figures 2, 4:
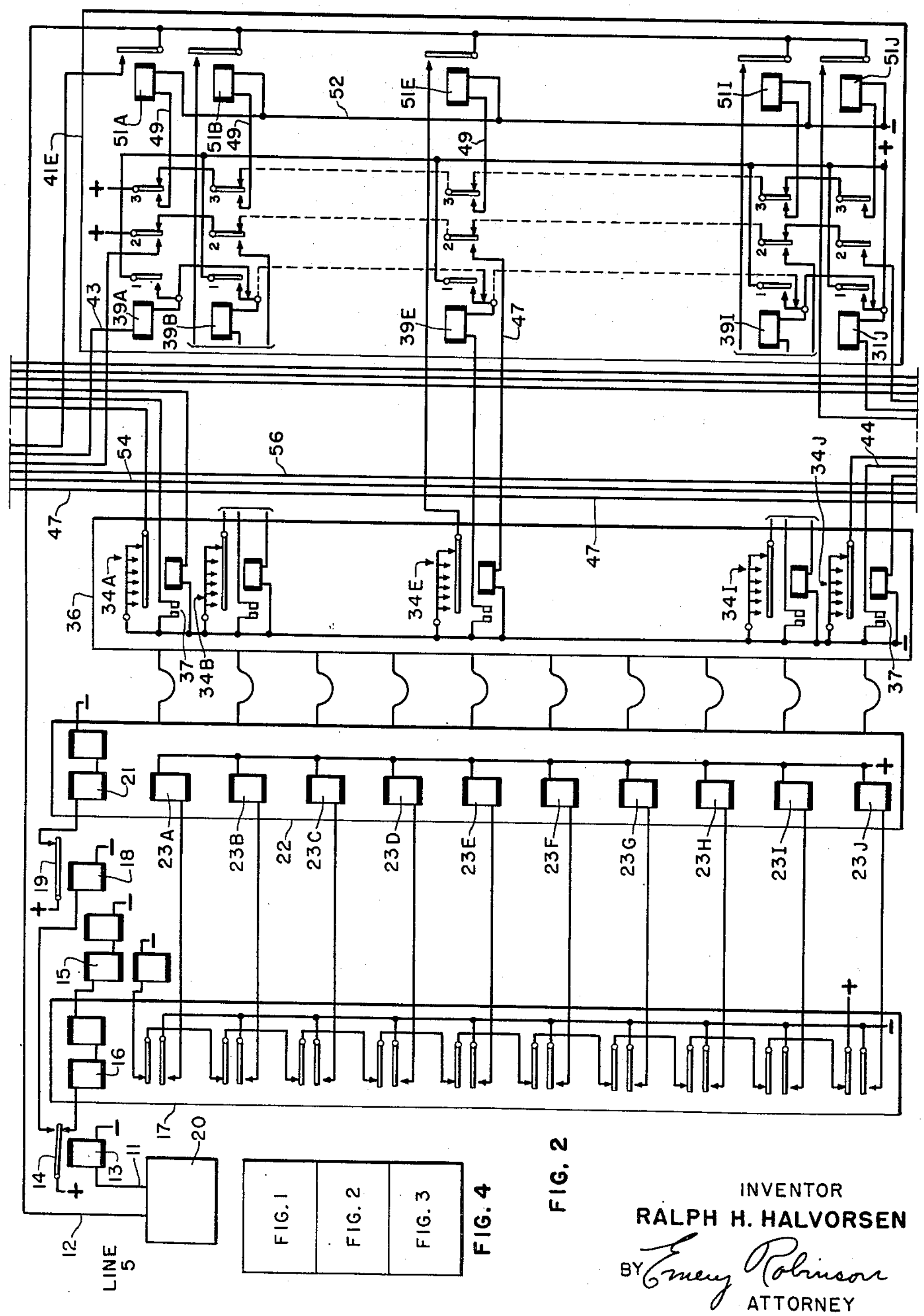
Figure 3:
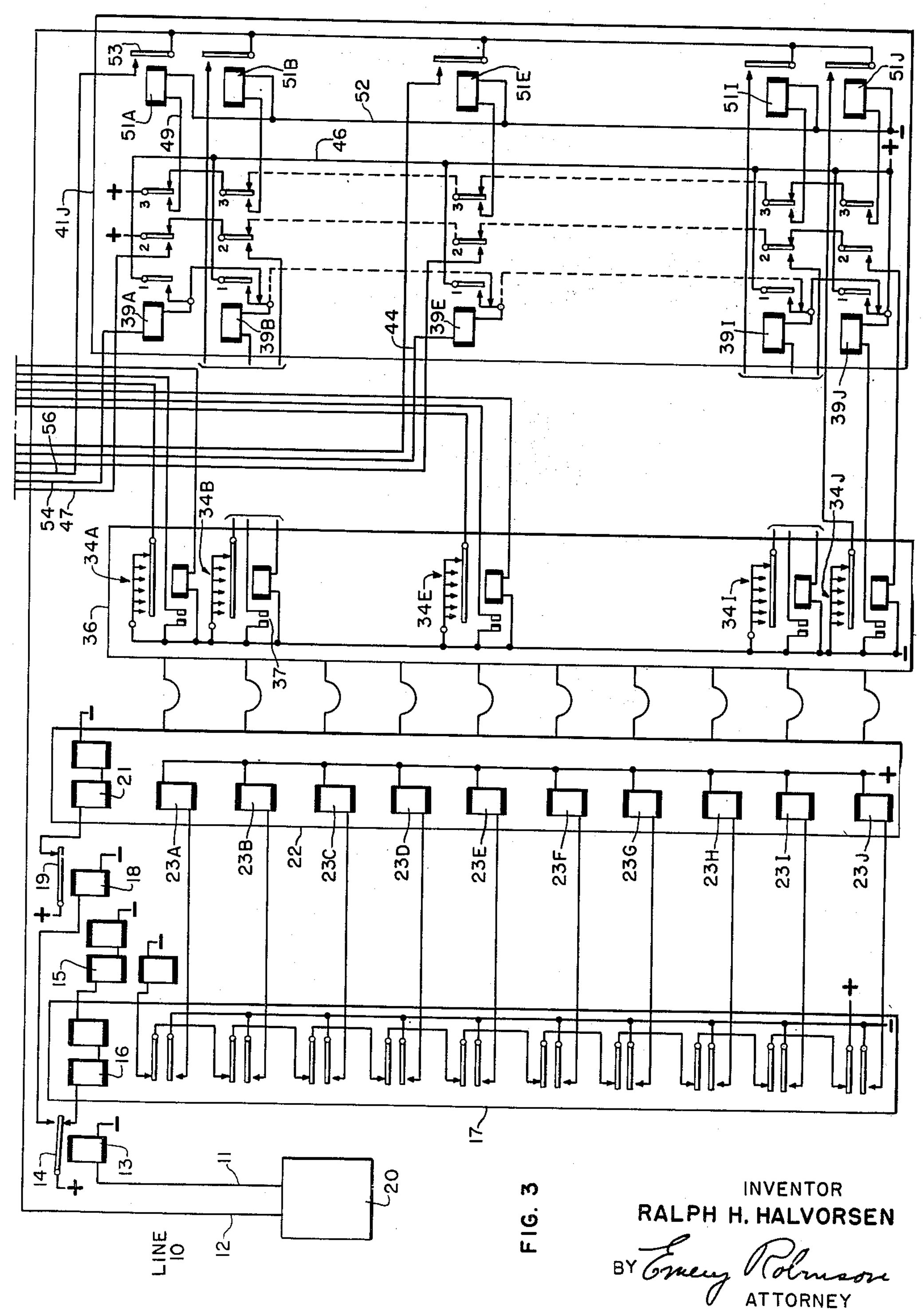

The above referred to general objects and other specific objects and advantages of the invention will be apparent and the invention will be more readily comprehended from the following detailed description when taken in conjunction with the appended drawings wherein:

Figs. 1–3 represent a schematic circuit diagram showing the principal features of the invention; and Fig. 4 shows how Figs. 1–3 should be assembled.

Reference should now be made to the drawings. A plurality of lines radiate from the central office (assume ten lines in the present system) of which only 1, 5, and 10 are shown. Fig. 1 shows schematically the apparatus at the central office associated with line 1, Fig. 2 that of line 5, and Fig. 3 that of line 10. Each of the lines has an incoming side 11 and an outgoing side 12 and a station 20 connected to both sides of the line. All incoming signals from an outlying station 20 are received by a line relay 13 which actuates its armature 14 in response thereto. A marking or current impulse causes the line relay 13 to attract the armature 14 and thereby complete an obvious circuit to a selector magnet 16 in a selective control unit 17 and to a selector magnet 15 of an intercept reperforator. Under this condition, that is, when the line relay 13 is energized, the circuit to a relay 18 is broken. However when the line relay 13 is de-energized in response to a spacing or no current impulse its armature 14 falls back against its cooperating back contact and thereby completes an obvious circuit to the relay 18. The relay 18 controls an armature 19 which is in an obvious circuit of a selector magnet 21. The selector magnet 21 controls a multiple reperforator 22.

The multiple reperforators 22 are all similar to one another and each have a plurality of perforating units for perforating telegraph tapes. The various perforating units in the multiple reperforators 22 are represented schematically only by their control magnets 23A–23J.

Only Fig. 1 will be referred to in the following discussion of the operation of the selective control unit 17 and multiple reperforator 22. Incoming messages over line 1 are impressed to the selector magnet 16 of the selective control unit 17 and to the selector magnet 15 of the intercept reperforator. At the beginning of each incoming message a group of signals are included which are indicative of the addressee of the message. The selective control unit 17 responds to this signal group by actuating certain contact swingers therein which correspond to the address signal transmitted. The contact swingers in the selective control unit 17 consist of two sets 24A–J and 26A–J. The swingers 26A–J are normally disengaged from their associated contacts and are for the purpose of completing energizing circuits for the control magnets 23A–J. Upon closure of any one of the swingers 26A–J with its associated contact a circuit is established to the corresponding control magnet 23A–J from negative battery, over a lead 27, through the closed swinger 26A–J, through the corresponding control magnet 23A–J, over a lead 29, to positive battery. Upon energization of one of the control magnets 23A–J, the reperforator associated therewith, in the multiple reperforator 22, reperforates those signals received by the multiple reperforator selector magnet 21.

The swingers 24A–J and their associated contacts are in a chain circuit extending through the intercept reperforator control magnet 31, from positive battery, through the swingers 24A–J and their associated contacts, over a lead 32, through the intercept reperforator control magnet 31, to negative battery. Obviously, when any one of the swingers 24A–J is disengaged from its associated contact the circuit to the intercept control magnet 31 is broken and the intercept reperforator will not reperforate signals even though they are received by the intercept reperforator selector magnet 15.

The selective control unit 17 functions in a manner such that a pair of swingers, for example 24D and 26D, are both moved downwardly in response to a "D" address signal to thereby open the swinger 24D and close the swinger 26D with their respective contacts. The intercept reperforator is therefore rendered inoperative and the reperforator controlled by the control magnet 23D is rendered operative. The swingers maintain this position while the message from the distant transmitting station is being transmitted until a special end of message signal group is transmitted. Upon receipt of the end of message signal group by the selective control unit selector magnet 16, the swingers 24D and 26D are moved upwardly thereby rendering the intercept reperforator operative and the reperforator associated with the control magnet 23D inoperative.

Messages received by the multiple reperforator 22 are reperforated in tape form on an appropriate tape 33A–J. Each of the tapes 33A–J is associated with a transmitter unit 34A–J in a multiple transmitter unit 36. Whenever a message is perforated in one of the tapes 33A–J, a contact 37 in the associated transmitter unit 34A–J is closed, which is the first operation in conditioning the transmitter units for operation.

Negative battery is supplied to each of the contacts 37 over a lead 38. The contacts 37 are also connected in circuit with an appropriate sequence relay. For example the contact 37 of the transmitter 34A in the multiple transmitter unit 36 associated with line 1 is connected over a lead 42 to the sequence relay 39A of the sequence circuit 41A; the contact 37 of the transmitter 34E in the multiple transmitter unit 36 associated with line 1 is connected over a lead 43 to the sequence relay 39A of the sequence circuit 41E (Fig. 2); and the contact 37 of the transmitter 36J in the multiple transmitter unit 36 associated with line 5 is connected over a lead 44 to the sequence relay 39E of the sequence circuit 41J (Fig. 3).

The sequence relays 39A–J in each of the sequence circuits 41A–J all have three armatures Nos. 1, 2, and 3. The No. 1 armatures of the sequence relays 39A–J are for the purpose of providing locking circuits for each of the relays, which extend from positive battery over a lead 46, through the armature and its associated front contact, through one of the sequence relays 39A–J, through the appropriate contact 37, over lead 38, to negative battery. The No. 2 armatures of the sequence relays 39A–J are normally in the positions as shown, against their back contacts, and thereby form a chain circuit when one of the sequence relays 39A–J is energized whereby one of the No. 2 armatures is pulled up against its front contact. This circuit extends from positive battery through the No. 2 armatures and their back contacts until reaching the No. 2 armature of the energized sequence relay 39A–J, through such No. 2 armature and its front contact over one of a group of leads 47, through a control magnet 48 in the transmitter 34A–J having a message awaiting transmission, over the lead 38, to negative battery.

The No. 3 armatures of the sequence relays 39A–J normally form an interconnecting chain circuit, but upon one of the No. 3 armatures being pulled up against its front contact a circuit is established from positive battery, through the chain circuit comprising one or more of the No. 3 armatures and their back contacts, through the closed No. 3 armature and its front contact, over one of a group of leads 49, through an associated connecting relay 51A–J, over a lead 52, to negative battery. Upon energization of one of the connecting relays 51A–J, it pulls its armature 53 against its front contact and thereby completes a message transmission circuit which extends from negative battery, over the lead 38, through the transmitting contacts in one of the transmitters 34A–J, over an associated lead 54, through the closed armature of the connecting relay 51A–J and its front contact, over the outgoing side of the appropriate line 1–10, to the receiver and positive battery at the outlying station.

A general description of the operation of the invention will now be given. It will be assumed that but a single station is on each line, however this is not a necessary limitation of the invention. It will also be assumed that the identification signal for the station on line 1 is an "A," on line 2, a "B," etc. It will be further assumed, for purposes of the present description, that the station on line 1 has a message to be transmitted to station J on line 10.

At the start of this message from station A on line 1 there is a signal group including a "J" which identifies the addressee station. This signal group actuates the line relay 13 of line 1 and the signals are in turn impressed upon the selective control unit selector magnet 16 and the intercept selector magnet 15. The selective control unit 17 responds to the address signal group by actuating the two swingers 24J and 26J, the swinger 24J being disengaged from its cooperating contact to break the chain circuit to the intercept control magnet 31, and the swinger 26J moving against its cooperating contact to complete the energizing circuit for the reperforator control magnet 23J. The message signals impressed to the reperforator selector magnet 21 are reperforated in the tape 23J. As soon as any signals are reperforated in the tape 23J the contact pair 37 in the transmitter unit 34J closes thereby conditioning a circuit to the sequence relay 39A in the sequence circuit 41J. This circuit to the sequence relay 39A extends from negative battery in the multiple transmitter 36 (Fig. 1), over the lead 38, through the closed contact pair 37, over a lead 54, through the sequence relay 39A in the sequence circuit 41J, over the chain circuit extending through the break contacts of the No. 1 armatures of the sequence relays, to positive battery. This circuit will be completed if no other sequence relay is energized, but if another sequence relay is energized the above referred to chain circuit will be broken as the No. 1 armature of such sequence relay is pulled up. Assuming that the chain circuit is complete, the sequence relay 39A will be energized when the contact pair 37 in the transmitter 34J is closed.

Energization of the sequence relay 39A causes it to attract its three armatures. When the No. 1 armature strikes its cooperating contact a locking circuit is established for the sequence relay 39A which shorts out the chain circuit. The locking circuit extends from negative battery, through the closed contact pair 37 of the transmitter 34J (Fig. 1), over the lead 54, through the sequence relay 39A in the sequence circuit 41J, through the No. 1 armature and its front contact of the relay 39A, over the lead 46, to positive battery. When the No. 3 armature of the energized sequence relay 39A strikes its cooperating front contact an energizing circuit is established for the connecting relay 51A in the sequence circuit 41J, which circuit extends from positive battery, through the No. 3 armature and its front contact, over the lead 49, through the connecting relay 51A, over the lead 52, to negative battery. Upon becoming energized, the connecting relay 51A attracts its armature 53 thereby moving it against its front contact to complete the transmission circuit to the outgoing side 12 of the line 10. The transmission circuit extends from negative battery, through the transmitting contacts of the transmitter 34J, over a lead 56, through the armature 53 and its front contact of the connecting relay 51A, over the outgoing side 12 of line 10. When the No. 2 armature of the energized sequence relay 39A strikes its cooperating front contact, an energizing circuit for the control magnet 48 of the transmitter 34J (Fig. 1) is established which extends from positive battery, through the No. 2 armature and its front contact, over the lead 47, through the control magnet 48 of the transmitter 34J, to negative battery.

When all of the armatures of the sequence relay 39A are attracted and the above traced circuits established, the transmitter 34J commences transmitting and continues until the message is completed or until the tape 33J becomes tight, whereupon the contact pair 37 in the transmitter 34J opens. Upon the opening of the contact pair 37 the sequence relay 39A in the sequence circuit 41J becomes de-energized allowing the three armatures thereof to fall away. Falling away of the No. 1 armature breaks the energizing circuit for the sequence relay 39A. Falling away of the No. 2 armature breaks the energizing circuit for the transmitter control magnet 48 thereby preventing further transmission. Falling away of the No. 3 armature breaks the energizing circuit for the connecting relay 51A.

When any one of the sequence relays 39A–J in any one of the sequence circuits 41A–J is conditioned for operation by the closure of the contact pair 37 in circuit therewith, such sequence relay is energized immediately if all of the sequence relays below it are de-energized. Under this condition the chain circuit through the break contacts associated with the No. 1 armatures of the lower sequence relays is completed so that the energizing circuit for the selected sequence relay is also complete. If one of the lower sequence relays 39A–J is energized, the chain circuit through the break contacts associated with the No. 1 armatures of such lower sequence relays is broken and therefore the selected sequence relay remains de-energized.

Assuming that the selected sequence relay 39A–J is energized, transmission by the corresponding transmitter 34A–J cannot commence until all the sequence relays above the selected sequence relay are de-energized. When one of the sequence relays above the selected sequence relay is energized it attracts its No. 2 armature thereby making it impossible to complete the energizing chain circuit for the transmitter control magnet 48 of the transmitter 34A–J having a message awaiting transmission. Further, when one of the sequence relays above the one selected is energized, such sequence relay also attracts its No. 3 armature making it impossible to complete the energizing circuit to the connecting relay 51A corresponding to the selected sequence relay.

The system comprising the present invention is designed for conveniently handling multiple address messages, that is, messages which are to be received by more than one addressee. In order that this desirable function may be accomplished it is only necessary that the station initiating the message include in the address portion thereof the address corresponding to all destinations of the message. When more than one station address is included in the address portion of the message the swingers 26A–J corresponding to such addresses close against their respective contact points and thereby complete the energizing circuits for the corresponding repreforator control magnets 23A–J. It will be recalled that once one of the swingers 26A–J closes against its respective contact it remains closed until an end-of-message signal is received.

Although the present invention has been described with reference to but a single embodiment thereof it will be obvious to those skilled in the art that numerous changes and modifications can be made therein without departing from the spirit or scope of the invention.

What is claimed is:

1. In an automatic telegraph switching system, a central office, a plurality of lines radiating from said central office, each of said lines having transmitting and receiving stations thereon, a plurality of multiple reperforators in said central office for reperforating messages transmitted by said stations on said lines, the number of reperforators in each multiple reperforator being equal to the number of receiving stations, a plurality of multiple transmitters in said central office for transmitting said messages reperforated by said multiple reperforators, the number of transmitters in each multiple transmitter being equal to the number of reperforators in a multiple reperforator, each of said reperforators has associated therewith one of said transmitters a plurality of selective control units in said central office, one of said selective control units being associated with each of said lines and one of said multiple reperforators for directing said messages transmitted by associated stations to a reperforator of said multiple reperforators corresponding to an addressee receiving station, and a sequence circuit associated with each of said lines for controlling transmission of messages by each of said reperforator-transmitter to any of said addressee receiving stations.

2. In an automatic telegraph switching system, a central office, a plurality of stations interconnected with said central office, multiple reperforating means at the central station for reperforating messages transmitted by each of said stations, the number of reperforating means within each multiple reperforating means being equal to the number of stations, selective control means associated with each station responsive to address signals in said messages for directing said messages to one of said reperforating means within the associated multiple reperforating means in accordance with said address signals, transmitting means associated with each of said reperforating means for transmitting said messages to said stations, and sequence control means associated with each station for controlling the operation of said transmitting means to insure the connection of only one transmitting means to any one station at any one time, said sequence control means including chain circuits, and means for breaking the chain circuits upon the initiation of transmission by any one transmitting means.

3. In an automatic telegraph switching system, a central office, a plurality of stations interconnected with said central office, multiple reperforating means in the central station for reperforating messages transmitted by each of said stations, the number of reperforating means in each multiple reperforating means being equal to the number of stations, selective control means associated with each station responsive to address signals in said messages for directing said messages to one of said reperforating means in the multiple reperforating means associated with the transmitting station in accordance with said address signals, transmitting means associated with each of said reperforating means for transmitting said messages to said stations, and a sequence circuit including initiating circuits, holding circuits, and transmission circuits for controlling the operation of said transmitting means to insure the sequential transmission of said messages to said stations, said sequence circuit including means for connecting each transmitting means associated with each reperforating means within a group to a different station.

4. In an automatic telegraph switching system, a central office, a plurality of lines interconnected with said central office having outlying stations for transmitting and receiving telegraph messages, a plurality of multiple transmitter units at said central office, an individual multiple transmitter unit being provided for each incoming line for handling all messages received therefrom, individual transmitters in each of said multiple transmitter units corresponding to each of said outgoing lines, each of said individual transmitters being capable of transmitting messages from but a single predetermined line to a single predetermined line, means associated with each incoming line for directing a message addressed to a particular station to a particular individual transmitter within the individual multiple transmitter associated with the incoming line that is transmitting the message, and sequence control means associated with each line for controlling the operation of said individual transmitters designed to transmit messages thereover, each of said sequence control means having initiating circuits for each of said transmitters associated therewith conditioned for operation when the associated transmitter has one of said messages awaiting transmission, transmitter starter circuits in each of said sequence control means corresponding to and for initiating operation of each of said transmitters associated therewith, and transmission circuits in each of said sequence control means for connecting said transmitters to the line over which it is capable of transmitting.

5. In an automatic telegraph switching system, a central office, a plurality of lines associated with said central office, a plurality of multiple reperforating means in said central office for reperforating messages transmitted by stations on said lines, a separate multiple reperforating means being provided for each of said lines, each of said multiple reperforating means comprising a plurality of individual reperforators, each of said individual reperforators in each of said multiple reperforating means being capable of reperforating only messages directed to a predetermined one of said plurality of lines, a plurality of individual transmitting means associated individually with each of said individual reperforators for transmitting messages over associated lines, the number of transmitting means associated with each multiple reperforating means being equal to the number of stations on the lines, means responsive to a plurality of different address signals in a message from a station on one of said lines for directing the message to a plurality of the individual reperforators within the multiple reperforator associated with said line corresponding to said address signals, whereby a plurality of reperforators and transmitters are associated to transmit a message from a single line to a plurality of addressed lines, and a sequence circuit for controlling the operation of said transmitting means to insure the sequential transmission of messages to said stations, said sequence circuit including transmission circuits for connecting a transmitter with one of said associated lines, initiating circuits for actuating a transmitter having a message therein, said initiating circuit also effecting upon actuation thereof the connection of the transmission circuit with the said associated line, and holding circuits for maintaining the initiating circuit energized during transmission of a message.

6. In an automatic telegraph switching system, a plurality of outlying subscriber stations, a central office, a signalling channel interconnecting each outlying station with the central office, said central office comprising a plurality of groups of reperforators, said groups of reperforators being equal in number to the number of outlying subscriber stations, the number of reperforators in each group being equal to the number of outlying subscriber stations, selective control means associated with each group of reperforators and one of said signalling channels, said selective control means adapted to direct a message from a signalling channel to a particular reperforator of its associated group in accordance with an address signal preceding the message, a group of transmitters associated with each group of reperforators, said transmitters in each group being equal in number to the number of outlying stations, each of said reperforators has associated therewith a single transmitter, control means for selectively connecting each transmitter in each group with a different signalling channel, and means operated by reception of a message in a transmitter for operating said last mentioned control means whereby each reperforator-transmitter is associated to transmit a message from a single predetermined subscriber to a single predetermined subscriber.

7. In an automatic telegraph switching system, a central office, a plurality of outlying subscriber transmitting stations, a plurality of outlying subscriber receiving stations, signalling channels interconnecting each outlying subscriber station with the central office, said central office comprising a plurality of groups of signal storing means, said groups of signal storing means being equal in number to the number of outlying subscriber transmitting stations, the number of signal storing means in each group being equal to the number of outlying subscriber receiving stations, selective control means associated with each group of signal storing means and the signalling channel emanating from each outlying subscriber transmitting station, said selective control means adapted to direct a message from an outlying transmitting station over its signalling channel to a particular signal storing means of its associated group in accordance with an address signal preceding the message, a group of transmitters associated with each group of signal storing means, the number of transmitters in each group being equal to the number of signal storing means in each group, said transmitters in each group being equal in number to the number of outlying subscriber receiving stations, control means for selectively connecting each transmitter in each group with a different one of the signalling channels connected to said outlying subscriber receiving stations, and means operated by the reception of a message in a transmitter for operating said last mentioned control means whereby each storing means-transmitter is associated to transmit a message from a single predetermined subscriber to a single predetermined subscriber.

8. In an automatic telegraph switching system, a central office, a plurality of outlying subscriber transmitting stations, a plurality of outlying subscriber receiving stations, signalling lines interconnecting each outlying subscriber station with the central office, said central office comprising a plurality of groups of reperforators, said groups of reperforators being equal in number to the number of outlying subscriber transmitting stations, the number of reperforators in each group being equal to the number of outlying receiving stations, selective control means associated with each group of reperforators associated with a line emanating from one of said outlying subscriber transmitting stations, said selective control means adapted to direct a message from an outlying transmitting station over its line to a particular reperforator of its associated group in accordance with an address signal preceding the message, a group of transmitters associated with each group of reperforators, said transmitters in each group being equal in number to the number of outlying receiving station, each of said reperforators has associated therewith a single transmitter, a group of normally open contact means associated with each line extending to an outlying receiving station, the number of contact means in each group being equal to the number of transmitters in a group of transmitters, means for connecting each of said contact means in each group with an individual transmitter in a different group of transmitters, individual relay means for operating each contact means, and means actuated by each transmitter for operating an individual relay means to complete a transmission circuit from an actuated transmitter, through its associated contact means, over a line, to a receiving station.

RALPH H. HALVORSEN.

REFERENCES CITED

The following references are of record in the file of this patent:

UNITED STATES PATENTS

| Number | Name | Date |
|---|---|---|
| 2,154,592 | Watson | Apr. 18, 1939 |
| 2,331,940 | Sylvester | Oct. 19, 1943 |
| 2,430,447 | Branson et al. | Nov. 11, 1947 |